US010829657B2

United States Patent
Fujii et al.

(10) Patent No.: US 10,829,657 B2
(45) Date of Patent: Nov. 10, 2020

(54) ACTIVE ENERGY RAY-CURABLE COMPOSITION, ACTIVE ENERGY RAY-CURABLE INK, COMPOSITION STORING CONTAINER, TWO-DIMENSIONAL OR THREE-DIMENSIONAL IMAGE FORMING DEVICE, METHOD FOR PRODUCING CURED PRODUCT, AND CURED PRODUCT

(71) Applicants: Hidetoshi Fujii, Kanagawa (JP); Michihiko Namba, Kanagawa (JP); Manabu Arita, Kanagawa (JP)

(72) Inventors: Hidetoshi Fujii, Kanagawa (JP); Michihiko Namba, Kanagawa (JP); Manabu Arita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/285,256

(22) Filed: Feb. 26, 2019

(65) Prior Publication Data
US 2019/0270901 A1 Sep. 5, 2019

(30) Foreign Application Priority Data
Mar. 1, 2018 (JP) .................. 2018-036510

(51) Int. Cl.
*C09D 11/30* (2014.01)
*C09D 11/38* (2014.01)
(Continued)

(52) U.S. Cl.
CPC .............. *C09D 11/38* (2013.01); *C09D 11/30* (2013.01); *C09D 11/322* (2013.01);
(Continued)

(58) Field of Classification Search
CPC ..... C09D 11/38; C09D 11/322; C09D 11/326; C09D 11/101; C09D 11/30; C09D 11/102; B41M 7/0081
See application file for complete search history.

(56) References Cited

U.S. PATENT DOCUMENTS

2007/0276066 A1* 11/2007 Ohno ................ C08L 33/06
524/186
2008/0198213 A1* 8/2008 Nakazawa ............ C08L 83/16
347/100
(Continued)

FOREIGN PATENT DOCUMENTS

JP 4-334551 11/1992
JP 2002-187906 7/2002
(Continued)

OTHER PUBLICATIONS

Milagros Delgado, et al. "Contrasting One- and Two-Cation Binding Behavior in syn-and anti-Anthraquinone Bibracchial Podand(BiP) Mono- and Dianions Assessed by Cyclic Voltammetry and Electron Paramagnetic Resonance Spectroscopy" J. Am. Chem. Soc. 1988, 110, 119-124.
(Continued)

*Primary Examiner* — Yaovi M Ameh
(74) *Attorney, Agent, or Firm* — Oblon, McClelland, Maier & Neustadt, L.L.P.

(57) ABSTRACT

An active energy ray-curable composition is provided which comprises a polymerizable monomer, a polysilane compound containing a phenyl group in a repeating unit, and a photopolymerization initiator.

15 Claims, 2 Drawing Sheets

(51) Int. Cl.
  *C09D 11/326* (2014.01)
  *C09D 11/322* (2014.01)
  *B41M 7/00* (2006.01)
  *C09D 11/101* (2014.01)
  *C09D 11/102* (2014.01)

(52) U.S. Cl.
  CPC ......... *C09D 11/326* (2013.01); *B41M 7/0081* (2013.01); *C09D 11/101* (2013.01); *C09D 11/102* (2013.01)

(56) References Cited

U.S. PATENT DOCUMENTS

| | | |
|---|---|---|
| 2013/0065028 A1 | 3/2013 | Fujii et al. |
| 2015/0079358 A1 | 3/2015 | Gotou et al. |
| 2017/0158890 A1* | 6/2017 | Hirose .................. B41J 2/01 |

FOREIGN PATENT DOCUMENTS

| | | |
|---|---|---|
| JP | 2003-261681 | 9/2003 |
| JP | 2005-272801 | 10/2005 |
| JP | 2008-223014 | 9/2008 |
| JP | 2008-239958 | 10/2008 |
| JP | 2016-117807 | 6/2016 |
| JP | 2016-186052 | 10/2016 |

OTHER PUBLICATIONS

Kazuaki Furukawa, et al. "Optical properties of Silicon Network Polymers" Macromolecules 1990, 23, 3423-3426.

Koichi Mikami, et al. "Anomalous threo-Diastereoselectivity in Allylic Silane- or Stannane-Aldehyde Condensation Reactions: New Interpretation of the Antiperiplanar vs. Synclinal Problem on the Transition-state Conformations" J. Chem. Soc., Chem. Commun., 1990, 1161-1163.

Anthony R. Manning, et al. "The Systematic Synthesis of Complexes containing $\mu_3$-CS Ligands as Two-electron Donors. The preparation and Structure of [{Co($\eta$-$C_5H_5$)}$_2${Fe(PPh$_3$)(CO)$_2$}($\mu_3$-S)($\mu_3$-CS)]"J. Chem. Soc., Chem. Commun., 1992, 897-898.

Kenkichi Sakamoto, et al. "Highly Ordered High Molecular Weight Alternating Polysilylene Copolymer Prepared by Anionic Polymerization of Masked Disilene", Macromolecules 1990, 23, 4494-4496.

Von E. Hengge, et al. "Preparation and Charcterization of Cyclohexasilane $Si_6H_{12}$" Z. Anorg. Allg. Chem. 459, 123-130(1979).

Edwin Hengge, et al. "Preparation and Properties of Cyclopentasilane", Monatshefte für Chemie 106, 503-512(1975), © by Springer-Verlag 1975 (with English Abstract).

Harald Stüger, et al. "Inorganic Bi(cyclopentasilanyls): Synthesis and Spectroscopic Characterization", Z. Anorg. allg. Chem. 621(1995) 1517-1522.

Philip Boudjouk, et al. "The Synthesis of the First Spiropentasilane, Octamethylspiropentasilane", J. Chem. Soc., Chem. Commun., 1984, 777-778.

* cited by examiner

ACTIVE ENERGY RAY-CURABLE COMPOSITION, ACTIVE ENERGY RAY-CURABLE INK, COMPOSITION STORING CONTAINER, TWO-DIMENSIONAL OR THREE-DIMENSIONAL IMAGE FORMING DEVICE, METHOD FOR PRODUCING CURED PRODUCT, AND CURED PRODUCT

CROSS-REFERENCE TO RELATED APPLICATIONS

This patent application is based on and claims priority pursuant to 35 U.S.C. § 119(a) to Japanese Patent Application No. 2018-036510, filed on Mar. 1, 2018, in the Japan Patent Office, the entire disclosure of which is hereby incorporated by reference herein.

BACKGROUND

Technical Field

The present disclosure relates to an active energy ray-curable composition, an active energy ray-curable ink, a composition storing container, a two-dimensional or three-dimensional image forming device, a method for producing a cured product, and a cured product.

Description of Related Art

Conventionally, active energy ray-curable compositions have been supplied to, and used in offset printing, silk screen printing, and as top coat agents, but recently, the quantity used has been increasing due to the advantages such as a decrease in cost due to the simplification of the drying process and the reduction of the amount of volatile solvent in response to environmental concerns.

Image formation using inkjet technology has been used in a wide variety of image forming devices for household use and industrial use.

Water-based and solvent-based inks have been widely used as inks, and are used in different application fields in accordance with their respective features. Generally, water-based inks having a high safety have been used in inkjet printers for household use, and solvent-based inks have been used in inkjet printers for industrial use because of their productivity and correspondence to recording media.

However, for water-based inks, in the case when the recording medium does not have a good ink absorption property, there are the problems that an adequate image quality can not be obtained, the water resistance of the ink itself is comparatively poor, the drying energy of the ink is large, and, the ink components adhere to the printerhead due to drying.

Further, as the solvent is volatile in solvent-based inks, there are the problems of odor, danger, and the toxicity of the solvent. There are inks which use solvents having a low volatility, but these inks dry slowly, and thus, there are problems with the image quality and the fixing property.

With respect to these problems, an active energy ray-curable composition does not use volatile solvents and has comparatively less odor, can print even if the recording medium does not have an ink absorption property, and can shorten the fixing time, and thus, can increase the image forming process speed. Therefore, the replacement from the water-based inks and the solvent-based inks to an active energy ray-curable composition has been considered.

However, an active energy ray-curable composition which can solve not only the problem of the odor of the monomer, but also the problem of the odor of a polymerization initiator contained in the ink has yet to be discovered.

Further, active energy ray-curable inks use several types of polymerization initiators having different absorption wavelengths in accordance with the type of light source such as a mercury lamp or a metal halide lamp, and react with and cure the monomers in the ink.

Recently, from the viewpoint of power saving, the use of ultraviolet light emitting diodes having peak emission wavelengths at 365 nm or 385 nm which consume less power has increased. Further, the practical application of light emitting diodes (LED) having a wavelength region (deep ultraviolet) of 255 to 350 nm (peak 285 nm) which is shorter than 365 nm has been considered, and inks that can also correspond to these LEDs are desired.

SUMMARY

One aspect of the present invention is an active energy ray-curable composition comprising a polymerizable monomer, a polysilane compound containing a phenyl group in a repeating unit, and a photopolymerization initiator.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
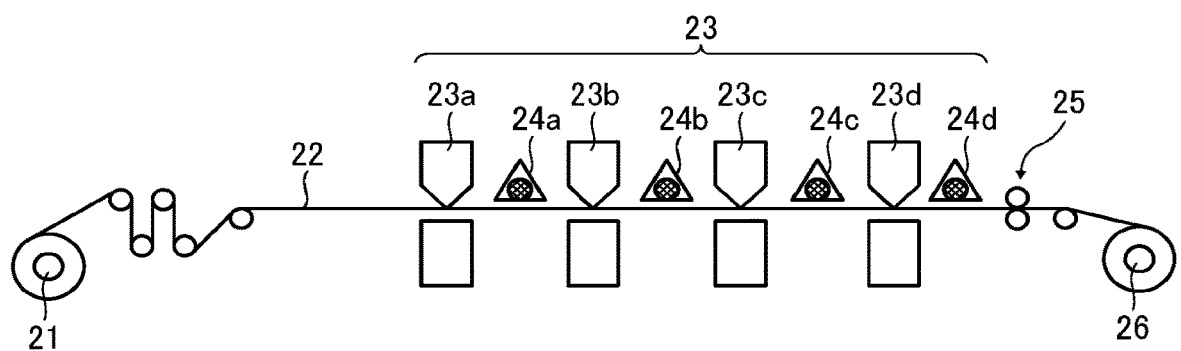
FIG. 1 is a schematic view illustrating an example of an image forming device of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An active energy ray-curable composition, an active energy ray-curable ink, a composition storing container, a two-dimensional or three-dimensional image forming apparatus, a method for producing a cured product, and a cured product according to the present disclosure will be described below with reference to the drawings. Note that, the present disclosure should not be construed as being limited to the embodiments described below, but changes such as other embodiments, addition, modification, and deletion are available within the range which can be conceived of by a person skilled in the art. Any mode is to be included within the scope of the present disclosure, so long as that mode has the operation and effect of the present disclosure.

The present disclosure relates to an active energy ray-curable composition comprising a polymerizable monomer, a polysilane compound containing a phenyl group in a repeating unit, and a photopolymerization initiator, wherein by combining the polysilane compound together with the photopolymerization initiator, the discharge ability is good, the curing ability improves, and as the amount of photopolymerization initiator can be minimized, the odor improves.

<Polysilane>

Various methods for synthesizing polysilanes are known. For example, Japanese Patent No. 3883453 describes the following methods (a) to (d) for synthesizing an aryl-substituted polysilane compound, and these methods can be appropriately used.

(a) Method that subjects a halosilane having an aryl group to dehalogenative polycondensation in the presence of an equivalent amount of an alkali metal relative to halogen atom (the so called "Kipping method", J. Am. Chem. Soc., Vol. 110, pp. 124 (1988), Macromolecules, Vol. 23, pp. 3423 (1990))

(b) Method that subjects a halosilane having an aryl group to dehalogenative polycondensation by electrode reduction (J. Chem. Soc., Chem. Commun., pp. 1161 (1990), J. Chem. Soc., Chem. Commun., pp. 897 (1992))

(c) Method of subjecting a hydrosilane to dehydrogenative polycondensation in the presence of a metal catalyst (Japanese Patent Application No. 4-334551)

(d) Method of anionic polymerization of disilane(s) cross-linked by biphenyl or the like (Macromolecules, Vol. 23, pp. 4494 (1990))

(e) After synthesizing the cyclic silicon compound having a phenyl group or alkyl group by the method described above, the product may be converted into compounds substituted with a hydroxyl group or halogen atom by a method known in the art (for example, Z. Anorg. Allg. Chem., Vol. 459, pp. 123-130 (1979)). These halogenated cyclosilane compounds can be synthesized by a method known in the art (for example, Mh. Chem. Vol. 106, pp. 503 (1975), Z. Anorg. Allg. Chem. Vol. 621, pp. 1517 (1995), J. Chem. Soc., Chem. Commun., pp. 777 (1984)).

Preferred phenyl group substituted polysilane compounds are polyphenylsilane and poly (methylphenyl) silane.

The blending ratio of the polysilane compound in the active energy ray-curable composition is preferably 1% by mass to 8% by mass. When the polysilane compound accounts for 1% by mass or more of the active energy ray-curable composition, the effect of adding the polysilane compound described below can be exhibited, and when the polysilane compound accounts for 8% by mass or less of the active energy ray-curable composition, the discharge ability does not deteriorate. More preferably, the blending ratio is 5% by mass or less.

The polysilane compound acts as a polymerization initiator, and is thought to have an effect which suppresses oxygen inhibition.

The mechanism of action of the polysilane compound is as follows.

In radical polymerization, it is known that the radical reaction is terminated due to low reactivity when peroxy radicals (R—O—O.) are generated. The polysilane compound is thought to have the effect which regenerates radicals by extracting hydrogen even if the peroxy radicals are generated.

(1)

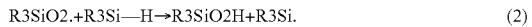

(2)

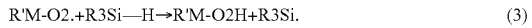

(3)

(M: Monomer)

The blending ratio of the polysilane compound in the active energy ray-curable composition is preferably and appropriately adjusted depending on the type of photopolymerization initiator.

<Polymerizable Monomer>

The following may be specifically used as the polymerizable monomer.

The (meth)acrylates, (meth)acrylamides, vinyl ethers and the like described below may also be used in combination.

Examples of the (meth)acrylates include ethylene glycol di(meth)acrylate, hydroxyl pivalic acid neopentyl glycol di(meth)acrylate, gamma-butyrolactone acrylate, isobornyl (meth)acrylate, formalized trimethylol propane mono(meth) acrylate, polytetramethylene glycol di(meth)acrylate, trimethylol propane (meth)acrylic acid benzoate, triethylene glycol di(meth)acrylate, tetraethylene glycol di(meth)acrylate, polyethylene glycol diacrylate [CH$_2$=CH—CO—(OC$_2$H$_4$)n-OCOCH=CH$_2$ (n is nearly equal to 4)], polyethylene glycol diacrylate [CH$_2$=CH—CO—(OC$_2$H$_4$)n-OCOCH=CH$_2$ (n is nearly equal to 9), polyethylene glycol diacrylate [CH$_2$=CH—CO—(OC$_2$H$_4$)n-OCOCH=CH$_2$ (n is nearly equal to 14), polyethylene glycol diacrylate [CH$_2$=CH—CO—(OC$_2$H$_4$)n-OCOCH=CH$_2$ (n is nearly equal to 23), dipropylene glycol di(meth)acrylate, tripropylene glycol di(meth)acrylate, polypropylene glycol dimethacrylate [CH$_2$=C(CH$_3$)—CO—(OC$_3$H$_6$)n-OCOC(CH$_3$)=CH$_2$ (n is nearly equal to 7)], 1,3-butanediol di(meth) acrylate, 1,4-butanediol diacrylate, 1,6-hexanediol di(meth) acrylate, 1,9-nonanediol di(meth)acrylate, neopentyl glycol diacrylate, tricyclodecane dimethanol diacrylate, propylene oxide-modified bisphenol A di(meth)acrylate, polyethylene glycol di(meth)acrylate, dipentaerythritol hexa(meth)acrylate, (meth)acryloyl morpholine, propylene oxide-modified tetramethylol methane tetra (meth)acrylate, dipentaerythritol hydroxypenta(meth)acrylate, caprolactone-modified dipentaerythritol hydroxypenta(meth)acrylate, ditrimethylol propane tetra(meth)acrylate, pentaerythritol tetra(meth) acrylate, trimethylol propane triacrylate, ethylene oxide-modified trimethylol propane tri(meth)acrylate, propylene oxide-modified trimethylol propane tri(meth)acrylate, caprolactone-modified trimethylol propane tri(meth)acrylate, pentaerythritol tri(meth)acrylate, tris(2-hydroxyethyl) isocyanurate tri(meth)acrylate, ethoxylated neopentyl glycol di(meth)acrylate, propylene oxide-modified neopentyl glycol di(meth)acrylate, propylene oxide-modified glyceryl tri (meth)acrylate, polyester di(meth)acrylate, polyester tri (meth)acrylate, polyester tetra(meth)acrylate, polyester penta(meth)acrylate, polyester poly(meth)acrylate, polyurethane di(meth)acrylate, polyurethane tri(meth)acrylate, polyurethane tetra(meth)acrylate, polyurethane penta(meth) acrylate, polyurethane poly(meth)acrylate, 2-hydroxypropyl (meth)acrylamide, N-vinyl caprolactam, N-vinyl pyrrolidone, N-vinyl formamide, cyclohexane dimethanol monovinyl ether, cyclohexane dimethanol divinyl ether, hydroxyethyl vinyl ether, diethylene glycol monovinyl ether, diethylene glycol divinyl ether, dicyclopentadiene vinyl ether, tricyclodecane vinyl ether, benzyl vinyl ether, ethyl oxetane methylvinyl ether and the like.

<Curing Means>

Preferably, the active energy ray-curable composition is cured by application of heat or irradiation with an active energy ray, and the latter is more preferable.

Specific examples of the active energy ray for curing the active energy ray-curable composition include, but are not limited to, electron beams, α-rays, β-rays, γ-rays, and X-rays, in addition to ultraviolet rays.

When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view.

Furthermore, ultraviolet light-emitting diode (UV-LED) and ultraviolet laser diode (UV-LD) are preferable as an ultraviolet light source.

Small sizes, long time working life, high efficiency, and high cost performance make such irradiation sources desirable.

<Photopolymerization Initiator>

The active energy ray-curable composition of the present disclosure contains a photopolymerization initiator.

The photopolymerization initiator produces active species such as a radical or a cation upon application of energy of an active energy ray and initiates polymerization of a polymerizable compound (monomer or oligomer).

As the photopolymerization initiator, it is suitable to use a known radical polymerization initiator, cation polymerization initiator, base producing agent, or a combination thereof. Of these, a radical polymerization initiator is preferable.

Specific examples of the radical polymerization initiators include, but are not limited to, aromatic ketones, acylphosphine oxide compounds, aromatic onium chlorides, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds.

Specifically, acylphosphine oxide compounds have a good compatibility with polysilanes, and bis-(2,4,6-trimethylbenzoyl) phenylphosphine oxide and 2,4,6-trimethylbenzoyl-diphenyl-phosphine oxide are preferable.

In addition, a polymerization accelerator (sensitizer) is optionally used together with the photopolymerization initiator.

The polymerization accelerator is not particularly limited. Preferred examples thereof include, but are not limited to, amines such as trimethylamine, methyl dimethanol amine, triethanol amine, p-diethylamino acetophenone, p-dimethyl amino ethylbenzoate, p-dimethyl amino benzoate-2-ethylhexyl, N,N-dimethyl benzylamine and 4,4'-bis(diethylamino)benzophenone. The content thereof is determined depending on the identity (type) of the polymerization initiator and the content thereof.

<Colorant>

The active energy ray-curable composition of the present disclosure may contain a colorant. As the colorant, various pigments and dyes may be used that impart black, white, magenta, cyan, yellow, green, orange, and gloss colors such as gold and silver, depending on the intended purpose of the composition and requisite properties thereof. A content of the colorant in the composition is not particularly limited, and may be appropriately determined considering, for example, a desired color density and dispersibility of the colorant in the composition. However, it is preferably from 0.1% by mass to 20% by mass relative to the total mass (100% by mass) of the composition.

Incidentally, the active energy ray-curable composition of the present disclosure does not necessarily contain a colorant but can be clear and colorless.

In such a case, for example, such a clear and colorless composition is good for an overcoating layer to protect an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment.

The dispersant has no particular limit and can be, for example, polymer dispersants conventionally used to prepare pigment dispersion (material).

The dyes include, for example, acidic dyes, direct dyes, reactive dyes, basic dyes, and combinations thereof.

<Organic Solvent>

The active energy ray-curable composition of the present disclosure optionally contains an organic solvent although it is preferable to spare it.

The curable composition free of an organic solvent, in particular volatile organic compound (VOC), is preferable because it enhances safety at where the composition is handled and makes it possible to prevent pollution of the environment.

Incidentally, the organic solvent represents a conventional non-reactive organic solvent, for example, ether, ketone, xylene, ethyl acetate, cyclohexanone, and toluene, which is clearly distinguished from reactive monomers.

Furthermore, "free of" an organic solvent means that no organic solvent is substantially contained. The content thereof is preferably less than 0.1 percent by mass.

<Other Components>

The active energy ray-curable composition of the present disclosure optionally contains other known components.

The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<Preparation of Active Energy Ray-Curable Composition>

The active energy ray-curable composition of the present disclosure can be prepared by using the components described above. The preparation devices and conditions are not particularly limited. For example, the active energy ray-curable composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, and a surfactant.

<Viscosity>

The viscosity of the active energy ray-curable composition of the present disclosure has no particular limit because it can be adjusted depending on the purpose and application devices. For example, if a discharger that discharges the composition from nozzles is employed, the viscosity thereof is preferably in the range of 3 to 40 mPa·s, more preferably 5 to 15 mPa·s, and particularly preferably 6 to 12 mPa·s in the temperature range of 20 degrees C. to 65 degrees C., preferably at 25 degrees C.

In addition, it is particularly preferable to satisfy this viscosity range by the composition free of the organic solvent described above.

Incidentally, the viscosity can be measured by a cone plate rotary viscometer (VISCOMETER TVE-22L, manufactured by TOKI SANGYO CO., LTD.) using a cone rotor (1034'× R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<Application Field>

The application field of the active energy ray-curable composition of the present disclosure is not particularly limited. It can be applied to any field where active energy ray-curable compositions are used. For example, the active energy ray-curable composition is selected to a particular application and used for a resin for processing, a paint, an adhesive, an insulant, a release agent, a coating material, a sealing material, various resists, and various optical materials.

Furthermore, the active energy ray-curable composition of the present disclosure can be used as an ink to form two-dimensional texts, images, and designed coating film on various substrates and in addition as a solid object forming material to form a three-dimensional object.

Figure 2:
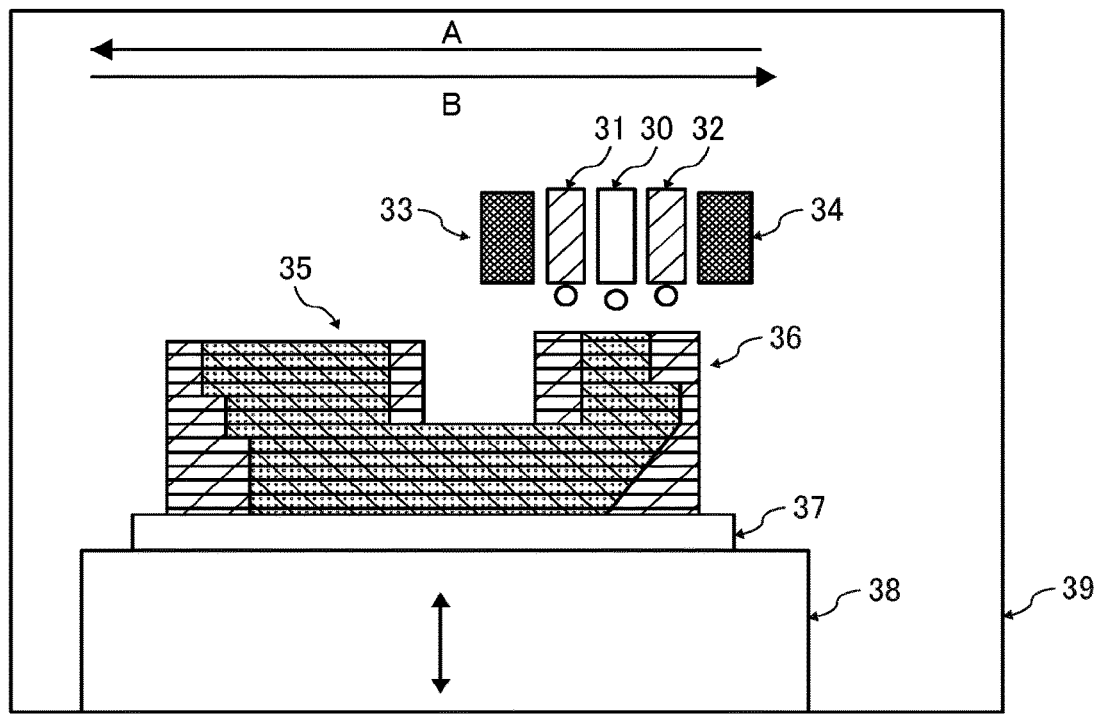
FIG. 2 is a schematic view illustrating an example of another image forming device of the present disclosure.
Figure 3A:
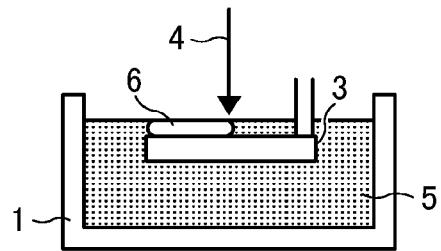
FIGS. 3A to 3D are schematic views illustrating an example of still another image forming device of the present disclosure.
Figure 3B:
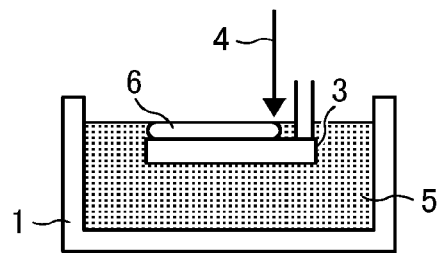
Figure 3C:
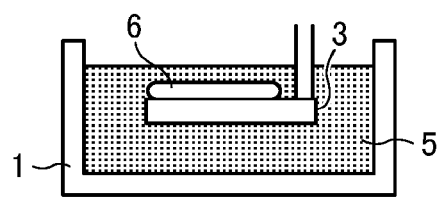
Figure 3D:
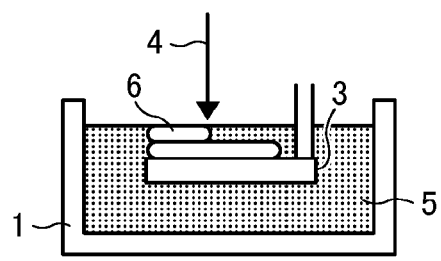

This three-dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2 and FIG. 3. FIG. 2 is a diagram illustrating a method of additive manufacturing to sequentially form layers of the active energy ray-curable composition of the present disclosure one on top of the other by repeating discharging the active energy ray-curable composition to particular areas followed by curing upon irradiation of an active energy ray (details will be described below). FIG. 3 is a diagram illustrating a method of additive manufacturing to sequentially form cured layers 6 having respective predetermined forms one on top of the other on a movable stage 3 by irradiating a storing pool (storing part) 1 of the active energy ray-curable composition 5 of the present disclosure with an active energy ray 4.

An apparatus for fabricating a three-dimensional object by the active energy ray-curable composition of the present disclosure is not particularly limited and can be a known apparatus.

For example, the apparatus includes a container, a supplier, and a discharger of the active energy ray-curable composition, and an active energy ray irradiator.

In addition, the present disclosure includes cured materials obtained by curing the active energy ray-curable composition and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

<Composition Storing Container>

The composition storing container of the present disclosure contains the active energy ray-curable composition and is suitable for the applications as described above.

For example, if the active energy ray-curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination.

Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

<Image Forming Method and Image Forming Device>

An image forming method of the present disclosure may be performed using an active energy ray and/or while applying heat.

The image forming method in accordance with some embodiments of the present invention includes an irradiating step of irradiating the active energy ray-curable composition of the present disclosure with an active energy ray to cure the active energy ray-curable composition. The image forming device of the present disclosure includes an irradiator to irradiate the active energy ray-curable composition of the present disclosure with an active energy ray and a storing part containing the active energy ray-curable composition of the present disclosure. The storing part may include the container mentioned above. Furthermore, the method and the apparatus may respectively include a discharging step and a discharger to discharge the active energy ray-curable composition. The method of discharging the active energy ray-curable composition is not particularly limited, and examples thereof include a continuous jetting method and an on-demand method. The on-demand method includes a piezo method, a thermal method, an electrostatic method, etc.

FIG. 1 is a diagram illustrating a two-dimensional image forming device equipped with an inkjet discharging device. Printing units 23*a*, 23*b*, 23*c*, and 23*d* respectively having ink cartridges and discharging heads for yellow, magenta, cyan, and black curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26.

Each of the printing unit 23a, 23b, 23c and 23d may have a heating mechanism to liquidize the ink at the ink discharging portion.

Moreover, in another embodiment of the present disclosure, a mechanism may optionally be included to cool down the recording medium to around room temperature in a contact or non-contact manner.

In addition, the inkjet recording method may be either of serial methods or line methods.

The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, ceramic, glass, metal, or composite materials thereof, each of which may be in the form of a sheet. The image forming device may have a one-side printing configuration and/or a two-side printing configuration. The recording medium is not limited to articles used as typical recording media. Examples of articles usable as the recording medium include cardboard, building materials (such as wall paper and floor material), concrete, cloth for apparel (such as T-shirts), textile, and leather as the recording medium.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic.

In addition, by laminating layers of two-dimensional images in part or the entire of a recording medium, a partially stereoscopic image (formed of two-dimensional part and three-dimensional part) and a three-dimensional object can be fabricated.

FIG. 2 is a schematic diagram illustrating another example of the image forming device (apparatus to fabricate a 3D object) of the present disclosure.

An image forming device 39 illustrated in FIG. 2 sequentially forms thin layers one on top of the other using a head unit having inkjet heads arranged movable in the directions indicated by the arrows A and B. In the image forming device 39, a discharge head unit 30 for additive manufacturing discharges a first active energy ray-curable composition, and discharge head units 31 and 32 for support discharge a second active energy ray-curable composition having a different composition from the first active energy ray-curable composition, while ultraviolet irradiators 33 and 34 adjacent to the discharge head units 31 and 32 cure the compositions.

To be more specific, for example, after the discharge head units 31 and 32 for support discharge the second active energy ray-curable composition onto a substrate 37 for additive manufacturing and the second active energy ray-curable composition is solidified by irradiation of an active energy ray to form a first substrate layer having a space for composition, the discharge head unit 30 for additive manufacturing discharges the first active energy ray-curable composition onto the pool followed by irradiation of an active energy ray for solidification, thereby forming a first additive manufacturing layer. This step is repeated multiple times lowering the stage 38 movable in the vertical direction to laminate the supporting layer and the additive manufacturing layer to fabricate a solid object 35.

Thereafter, an additive manufacturing support 36 is removed, if desired.

Although only a single discharge head unit 30 for additive manufacturing is provided to the image forming device 39 illustrated in FIG. 2, it can have two or more discharge head units 30.

EXAMPLES

The present disclosure will be further described below by way of examples, but the present disclosure is not limited to the following examples.
Note that, in the following examples, "parts" indicates "parts by mass", and "%" indicates "% by mass".
[Preparation of a White Inorganic Particle Dispersion Liquid]

After adding 2.3 parts of a monofunctional phenyl glycidyl ether acrylate (a3) "New Frontier PGA" manufactured by DSK Co. Ltd., 26.7 parts of a monofunctional monomer ACMO (the following structural formula M-4; acryloylmorpholine, manufactured by Kohjin Film & Chemicals Co., Ltd.), 0.6 part of a high molecular weight pigment dispersant "SOLSPERS 24000GR" manufactured by The Lubrizol Corporation, 0.4 part of a high molecular weight pigment dispersant "Ajisper PB881" manufactured by Ajinomoto Fine-Techno Co., Inc., silica content: 3% by mass, and 20.0 parts of titanium oxide (C) "Titanix JR-806" having an alumina content of 1% manufactured by Tayca Corporation, and stirring with a stirrer while mixing for 1 hour, the composition was stirred in a bead mill for 2 hours, and a white inorganic particle dispersion liquid was prepared.
[Preparation of a Carbon Black (Bk) Dispersion Liquid]

After adding 1.0 part of a carboxylic ester-containing acrylic block copolymer (dispersant, product name: DISPERBYK-168, BYK Japan KK, acid value: 0 mgKOH/g, amine value: 11 mgKOH/g), 40.0 parts of a monofunctional monomer ACMO (the following structural formula M-4; acryloylmorpholine, manufactured by Kohjin Film & Chemicals Co., Ltd.), 10.0 parts of carbon black "MA14" manufactured by Mitsubishi Chemical Corporation, and stirring with a stirrer while mixing for 1 hour, the composition was stirred in a bead mill for 2 hours, and a Bk pigment dispersion liquid was prepared.

Examples 1 to 12 and Comparative Examples 1 to 4

<Preparation of an Active Energy Ray-Curable Composition>

The active energy ray-curable compositions of Examples 1 to 12 and Comparative examples 1 to 4 were prepared by a conventional method based on the material and the content (parts by mass) presented in Table 1.

Note that, in Table 1, the trade name of the compound used and the name of the manufacturing company indicates the contents as follows.

<Monomer>
  ACMO: acryloylmorpholine (manufactured by KJ Chemicals Corporation)
  IBXA: isobornyl acrylate (manufactured by OSAKA ORGANIC CHEMICAL INDUSTRY LTD.)
  PEA: phenoxyethyl acrylate (manufactured by OSAKA ORGANIC CHEMICAL INDUSTRY LTD.)
  NVC: N-vinyl caprolactam (manufactured by ISP Co., Ltd.)
  DPGDA: dipropylene glycol diacrylate (manufactured by OSAKA ORGANIC CHEMICAL INDUSTRY LTD.)
  SR444: pentaerythritol triacrylate (manufactured by Sartomer Company, Inc.)
<Polymerization Initiator>
  TPO: 2,4,6-trimethylbenzoyl-diphenyl-phosphine oxide (manufactured by LAMBERTI S.p.A)
  Ir819: bis-(2,4,6-trimethylbenzoyl)phenylphosphine oxide (manufactured by BASF SE)
  Ir907: 2-methyl-1-(4-methylthiophenyl)-2-morpholino-propan-1-one (manufactured by BASF SE)
<Sensitizer>
  DETX: 2,4-Diethylthioxanthen-9-one (manufactured by Daido Chemical Corporation)
<Polysilane>
  POLY (DIMETHYLSILANE): (Mw 1000-3000) (Manufactured by Gelest, Inc.)
  POLY (PHENYLMETHYLSILANE): (>Mw 1000) (polysilane having a phenyl group) (Manufactured by Gelest, Inc.)
  OGSOL SI-10-10 (polysilane having a phenyl group, Mw 1100) (manufactured by Osaka Gas Chemicals Co., Ltd.)
  OGSOL SI-10-20 (polysilane having a phenyl group, Mw 1800) (manufactured by Osaka Gas Chemicals Co., Ltd.)
  OGSOL SI-20-10 (polysilane having a phenyl group, Mw 1200) (manufactured by Osaka Gas Chemicals Co., Ltd.)
  OGSOL SI-20-14 (polysilane having a phenyl group, Mw 1100) (manufactured by Osaka Gas Chemicals Co., Ltd.)

Note that, OGSOL SI-10-10 and OGSOL SI-10-20 are polysilanes having the structure represented by Formula (1):

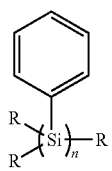

(1)

Further, OGSOL SI-20-10 and OGSOL SI-20-14 are polysilanes having the structure represented by Formula (2):

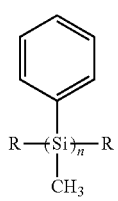

(2)

In the Formulae (1) and (2), n represents the number of repeating units and R represents an atomic group. Both of n and R are not particularly limited. The polysilanes represented by the Formula (1) or Formula (2) are not particularly limited in properties such as molecular weight, however, those used in the Examples had a molecular weight (Mw) in the range of about 100 to 127,000.

<<Evaluation>>

<Preparation of Cured Product>

The active energy ray-curable compositions of each example and comparative example were applied with a bar coater #6 on a commercially available PET film, each sample was irradiated with light to cure the active energy ray-curable composition, and a coating film (cured product) having an average thickness of 10 μm was formed.

—Curing Conditions—

A: Light irradiation was performed by a metal halide lamp at a cumulative light of 500 mJ/cm$^2$ in a wavelength region corresponding to the UV-A region (wavelength of 350 nm or more to 400 nm or less).

B: Light irradiation was performed by UVLED (center wavelength of 365 nm) manufactured by Integration Technology Co., Ltd. at a cumulative light of 500 mJ/cm$^2$.

<Pencil Hardness Test>

The photocurability of the prepared cured products of Examples 1 to 12 and Comparative examples 1 to 4 was verified by the pencil hardness test.

The pencil hardness test was performed based on JIS K5600-5-4 (scratch hardness: pencil method).

—Evaluation Criteria—

A: HB or harder

B: Softer than HB

C: There was tackiness, thus measurement was not possible

<Odor>

The evaluation criteria for the odor was as follows.

—Evaluation Criteria—

A: At a distance of 5 cm from the sample, there was no odor or no unpleasant feeling B: At a distance of 50 cm from the sample, there was no odor or no unpleasant feeling C: At a distance of 50 cm from the sample, a strong unpleasant feeling was caused by a characteristic odor <Discharge Stability>

Each ink which is an obtained active energy ray-curable ink comprising the active energy ray-curable composition was continuously discharged for 60 minutes from 384 nozzles by an inkjet discharge device equipped with a GEN4 printerhead (manufactured by Ricoh Co., Ltd), the number of nozzles in which discharge failure occurred was counted, and the "discharge stability" was evaluated based on the following evaluation criteria.

Note that, in the inkjet discharge device, the driving frequency was set to 18 kHz, the heating temperature was set to 35° C., and, the ink discharge amount was set to 2 pL each time.

—Evaluation Criteria—

A: 2 or less

B: 3 or more

TABLE 1

| | Composition | Examples | | | | | | | | |
|---|---|---|---|---|---|---|---|---|---|---|
| | | 1 | 2 | 3 | 4 | 5 | 6 | 7 | 8 | 9 |
| Polymerizable monomer | ACMO | 30.0 | 30.0 | 30.0 | 30.0 | 30.0 | 30.0 | 30.0 | 30.0 | 30.0 |
| | IBXA | 36.5 | 34.5 | 34.5 | 27.5 | 26.6 | 30.5 | 29.5 | 32.5 | 31.5 |
| | FEA | 10.0 | 10.0 | 10.0 | 10.0 | 10.0 | 10.0 | 10.0 | 10.0 | 10.0 |
| | NVC | | | | 5.0 | 5.0 | 5.0 | 5.0 | | |
| | DPGDA | 10.0 | | 10.0 | 10.0 | 10.0 | | 10.0 | 10.0 | 10.0 |
| | SR444 | | 10.0 | | | | 10.0 | | | |
| Pigment (parts by mass of solid content) | White inorganic particle dispersion | 6.0 | 6.0 | 6.0 | 6.0 | 6.0 | 6.0 | 6.0 | 6.0 | 6.0 |
| | Bk pigment dispersion liquid | | | | | | | | | |
| Photopolymerization initiator | Ir 819 | 5.0 | 4.0 | | 1.0 | 3.0 | 0.5 | 0.5 | 1.0 | 1.0 |
| | Ir TPO | 1.0 | 2.0 | | 5.0 | 3.0 | 1.5 | 0.5 | 2.0 | 2.0 |
| | Ir 907 | | | 6.0 | | | | | | |
| Polysilane | POLY(DIMETHYLSILANE) | | | | | | | | | |
| | POLY(PHENYLMETHYLSILANE) | | | | | | | | | |
| | OGSOL SI-10-10 | | 1.0 | | | | | | 4.0 | 4.0 |
| | OGSOL SI-10-20 | 0.5 | 2.0 | 2.0 | 3.0 | 3.0 | 3.0 | 4.0 | 4.0 | 4.0 |
| | OGSOL SI-20-10 | 0.5 | | 1.0 | | 3.0 | 3.0 | | | 1.0 |
| | OGSOL SI-20-14 | | | | 2.0 | | | 4.0 | | |
| Sensitizer | DETX | 0.5 | 0.5 | 0.5 | 0.5 | 0.5 | 0.5 | 0.5 | 0.5 | 0.5 |
| | Total | 100 | 100 | 100 | 100 | 100 | 100 | 100 | 100 | 100 |
| | Amount of initiator | 6 | 6 | 6 | 6 | 6 | 2 | 1 | 3 | 3 |
| | Amount of polysilane | 1 | 3 | 3 | 5 | 6 | 6 | 8 | 8 | 9 |
| Evaluation method | Evaluation item | | | | | Evaluation result | | | | |
| Inkjet | Discharge ability | A | A | A | A | B | A | A | A | B |
| Metal halide lamp curing(500 mJ/cm$^2$) | Hardness | A | A | A | A | B | B | B | B | B |
| | Odor | B | B | B | B | B | B | B | B | B |
| LED curing (300 mJ/cm$^2$) | Hardness | A | A | C | A | A | C | C | C | C |
| | Odor | B | B | B | B | B | B | B | B | B |

| | Composition | Examples | | | Comparative examples | | | |
|---|---|---|---|---|---|---|---|---|
| | | 10 | 11 | 12 | 1 | 2 | 3 | 4 |
| Polymerizable monomer | ACMO | 30.0 | 30.0 | 30.0 | 30.0 | 30.0 | 30.0 | 30.0 |
| | IBXA | 33.0 | 33.5 | 34.5 | 36.5 | 39.5 | 37.5 | 34.5 |
| | FEA | 10.0 | 10.0 | 10.0 | 9.0 | 9.0 | 9.0 | 10.0 |
| | NVC | 5.0 | 5.0 | | | | | |
| | DPGDA | 10.0 | 10.0 | | 10.0 | 10.0 | 10.0 | |
| | SR444 | | | 10.0 | | | | 10.0 |
| Pigment (parts by mass of solid content) | White inorganic particle dispersion | | | 6.0 | 6.0 | 6.0 | 6.0 | 6.0 |
| | Bk pigment dispersion liquid | 2.5 | 3.0 | | | | | |
| Photopolymerization initiator | Ir 819 | 4.0 | 0.5 | 2.0 | 4.0 | | | 3.0 |
| | Ir TPO | 2.0 | 1.5 | 4.0 | 4.0 | | | 3.0 |
| | Ir 907 | | | | | | | |
| Polysilane | POLY(DIMETHYLSILANE) | | | | | | | 3.0 |
| | POLY(PHENYLMETHYLSILANE) | | | 3.0 | | | | |
| | OGSOL SI-10-10 | 1.0 | | | 2.0 | | | |
| | OGSOL SI-10-20 | 2.0 | 3.0 | | | 3.0 | 3.0 | |
| | OGSOL SI-20-10 | | 3.0 | 3.0 | | | 4.0 | |
| | OGSOL SI-20-14 | | | | | | | |
| Sensitizer | DETX | 0.5 | 0.5 | 0.5 | 0.5 | 0.5 | 0.5 | 0.5 |
| | Total | 100 | 100 | 100 | 100 | 100 | 100 | 100 |
| | Amount of initiator | 6 | 2 | 6 | 8 | | | 6 |
| | Amount of polysilane | 3 | 6 | 3 | | 5 | 7 | 3 |
| Evaluation method | Evaluation item | | | | | | | |
| Inkjet | Discharge ability | A | A | A | A | A | A | A |
| Metal halide lamp curing(500 mJ/cm$^2$) | Hardness | A | B | A | C | C | C | C |
| | Odor | B | B | B | C | B | B | B |
| LED curing (300 mJ/cm$^2$) | Hardness | A | C | A | B | C | C | C |
| | Odor | B | B | B | C | B | B | B |

The embodiments of the present disclosure are as follows.
(1) An active energy ray-curable composition comprising a polymerizable monomer, a polysilane compound containing a phenyl group in a repeating unit, and a photopolymerization initiator.

(2) The active energy ray-curable composition according to (1), wherein the polysilane compound is a compound having a structure represented by Formula (1):

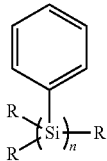

(1)

or Formula (2):

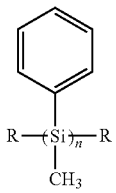

(2)

(3) The active energy ray-curable composition according to (1), wherein the polysilane compound accounts for 1% by mass to 8% by mass of the active energy ray-curable composition.
(4) The active energy ray-curable composition according to (1), wherein the polysilane compound accounts for 1% by mass or more and less than 5% by mass of the active energy ray-curable composition.
(5) The active energy ray-curable composition according to (1), wherein the polysilane compound accounts for 5% by mass to 8% by mass of the active energy ray-curable composition.
(6) The active energy ray-curable composition according to (1), wherein the photopolymerization initiator is an acylphosphine oxide.
(7) An active energy ray-curable ink comprising the active energy ray-curable composition according to (1).
(8) The active energy ray-curable ink according to (7), wherein the active energy ray-curable ink is an inkjet ink.
(9) A composition storing container comprising a container and the active energy ray-curable composition according to (1) stored in the container.
(10) A two-dimensional or three-dimensional image forming device comprising a container storing the active energy ray-curable composition according to (1), and an irradiator configured to irradiate the active energy ray-curable composition with an active energy ray.
(11) The two-dimensional or three-dimensional image forming device according to (10) further comprising a discharger configured to discharge the active energy ray-curable composition by an inkjet recording method.
(12) A method for producing a two-dimensional or three-dimensional cured product comprising irradiating the active energy ray-curable composition according to (1) with an active energy ray.

(13) The method for producing a two-dimensional or three-dimensional cured product according to (12) further comprising discharging the active energy ray-curable composition by an inkjet recording method.
(14) The method for producing a two-dimensional or three-dimensional cured product according to (12), wherein the active energy ray is a light-emitting diode light.
(15) A cured product of the active energy ray-curable composition according to (1.

The present disclosure can provide an active energy ray-curable composition that fulfills all of the improvements of the discharge ability, the curing ability, and the odor. Further, the printed matter obtained using the composition of the present disclosure can provide a cured film having a good surface property.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An active energy ray-curable composition, comprising:
a polymerizable monomer;
a polysilane compound containing only one phenyl group in a repeating unit; and
a photopolymerization initiator,
wherein the phenyl group is not contained in a main chain of the polysilane compound.

2. The active energy ray-curable composition according to claim 1, wherein the polysilane compound has a structure represented by Formula (1):

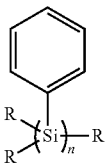

(1)

or Formula (2):

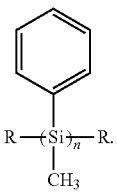

(2)

3. The active energy ray-curable composition according to claim 1, wherein the polysilane compound accounts for 1% by mass to 8% by mass of the active energy ray-curable composition.

4. The active energy ray-curable composition according to claim 1, wherein the polysilane compound accounts for 1% by mass or more and less than 5% by mass of the active energy ray-curable composition.

5. The active energy ray-curable composition according to claim 1, wherein the polysilane compound accounts for 5% by mass to 8% by mass of the active energy ray-curable composition.

6. The active energy ray-curable composition according to claim 1, wherein the photopolymerization initiator is an acylphosphine oxide.

7. An active energy ray-curable ink, comprising
the active energy ray-curable composition according to claim 1.

8. The active energy ray-curable ink according to claim 7, wherein the active energy ray-curable ink is an inkjet ink.

9. A composition storing container, comprising:
a container; and
the active energy ray-curable composition according to claim 1 stored in the container.

10. A two-dimensional or three-dimensional image forming device, comprising:
a container storing the active energy ray-curable composition according to claim 1; and
an irradiator configured to irradiate the active energy ray-curable composition with an active energy ray.

11. The two-dimensional or three-dimensional image forming device according to claim 10, further comprising:
a discharger configured to discharge the active energy ray-curable composition by an inkjet recording method.

12. A method for producing a two-dimensional or three-dimensional cured product, the method comprising:
irradiating the active energy ray-curable composition according to claim 1 with an active energy ray.

13. The method according to claim 12, further comprising:
discharging the active energy ray-curable composition by an inkjet recording method.

14. The method according to claim 12, wherein the active energy ray is a light-emitting diode light.

15. A cured product of the active energy ray-curable composition according to claim 1.

* * * * *